United States Patent

Sato

[15] 3,685,753
[45] Aug. 22, 1972

[54] POWER TRANSMISSION SOCKET FOR BOBBINS

[72] Inventor: Isao Sato, 2-17, 2-Chome Tomigaoka, Nara Prefecture, Japan

[22] Filed: Sept. 23, 1969

[21] Appl. No.: 860,265

[30] Foreign Application Priority Data

Sept. 24, 1968 Japan ..................... 43/68856

[52] U.S. Cl. ............................................. 242/46.21
[51] Int. Cl. ........................... B65h 54/40, B65h 79/00
[58] Field of Search ........ 242/46.21, 46.2, 46.3, 46.4, 242/46.5, 46.6

[56] References Cited

UNITED STATES PATENTS

| | | | |
|---|---|---|---|
| 734,922 | 7/1903 | Metcalf | 242/46.4 |
| 2,219,868 | 10/1940 | Hambleton et al. | 242/46.21 |
| 3,006,565 | 10/1961 | Pelletier | 242/46.4 |
| 3,132,817 | 5/1964 | Atwood et al. | 242/46.21 |
| 3,167,262 | 1/1965 | Adams et al. | 242/46.21 |
| 3,368,767 | 2/1968 | Schmidt | 242/46.21 |

*Primary Examiner*—Stanley N. Gilreath
*Attorney*—Ernest G. Montague

[57] ABSTRACT

A power transmission socket for bobbins comprising a pair of coupled members, a first of which is connectable to a bobbin and second of which is connectable to a driving base of a spindle. The members are coupled to each other such that they can turn relative to each other a predetermined small distance for gripping the spindle. The members are provided with integral projections, respectively, and form complementary recesses rotatably displaceable relative to corresponding projections which have a spindle gripping surface and an outward engaging surface urging projections displaced inwardly as well as in the direction opposite to that of the rotation of the spindle causing the gripping surface to grip the spindle.

3 Claims, 22 Drawing Figures

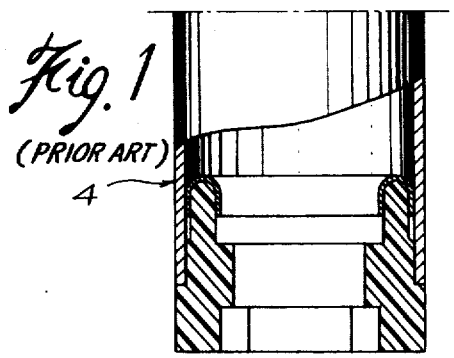
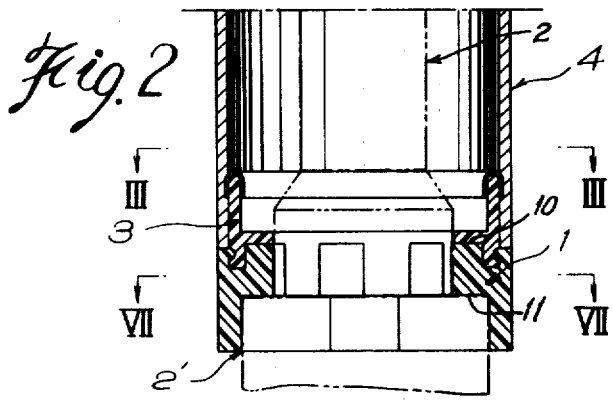
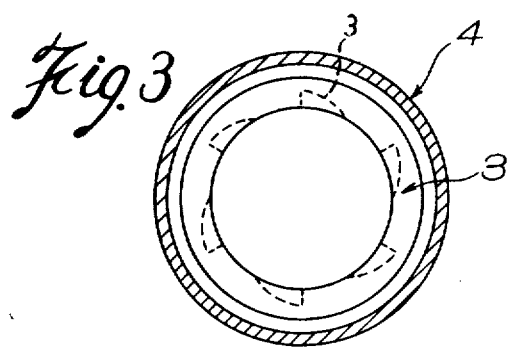
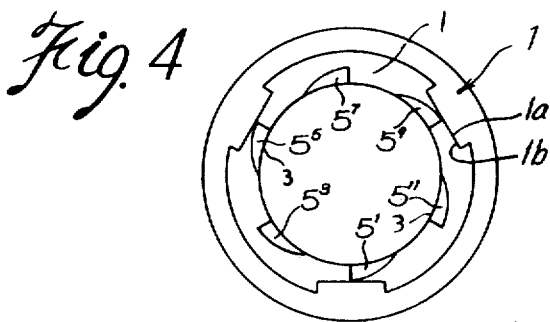
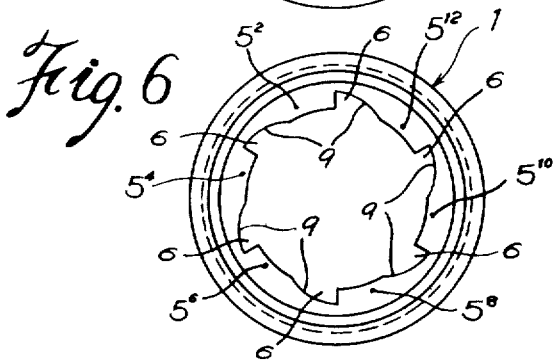
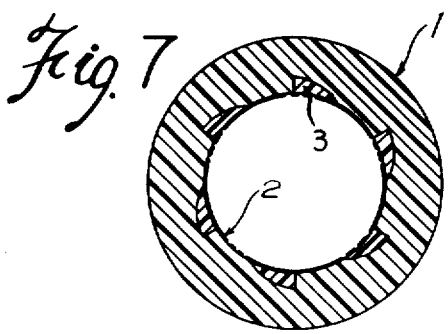
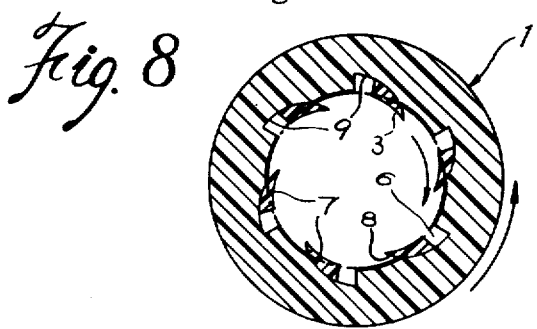

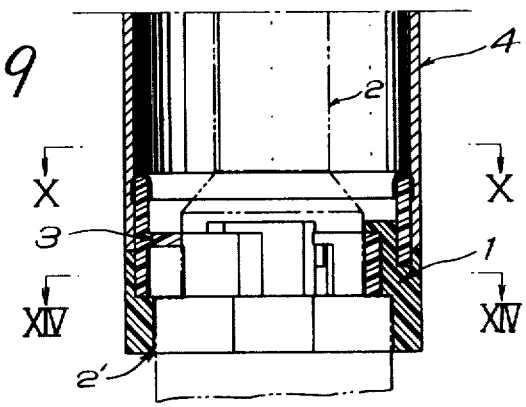
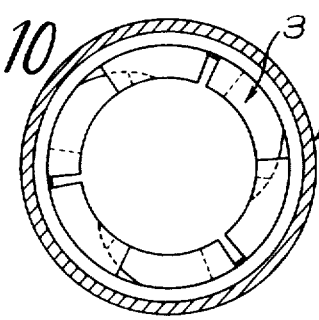
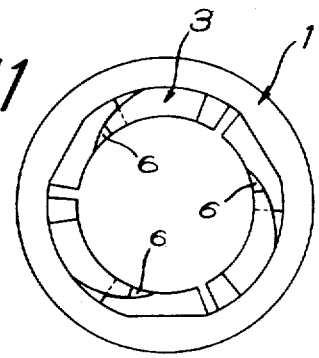
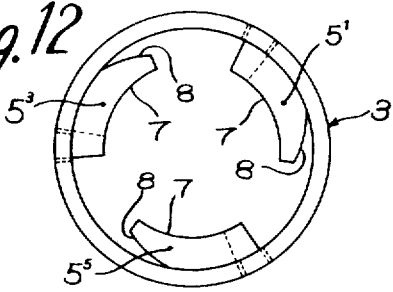
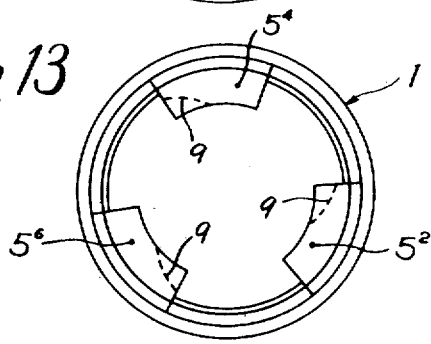
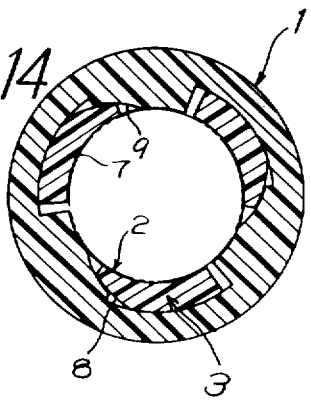
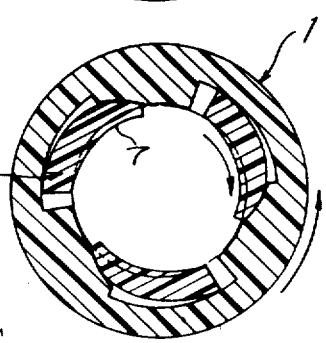

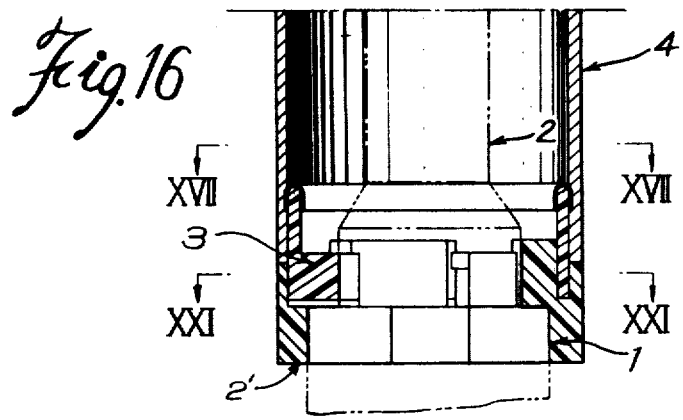
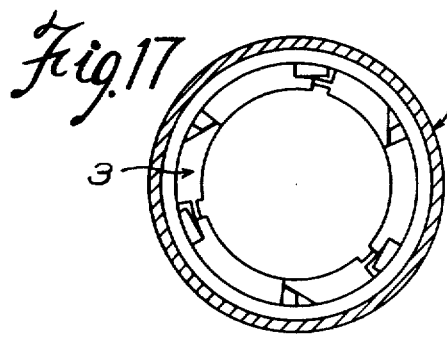
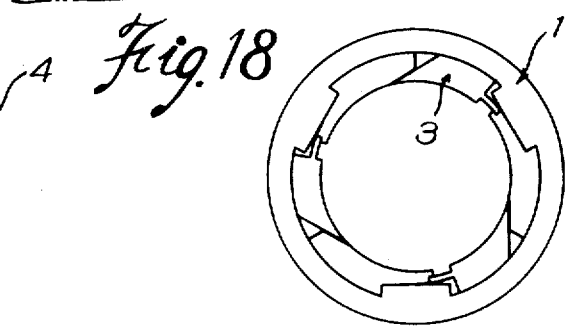
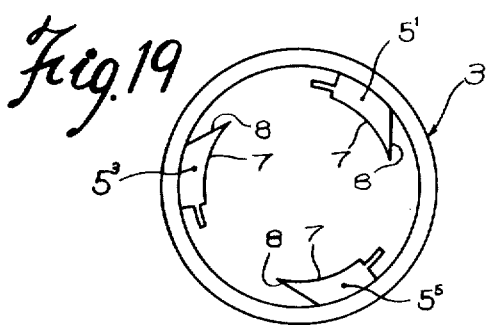
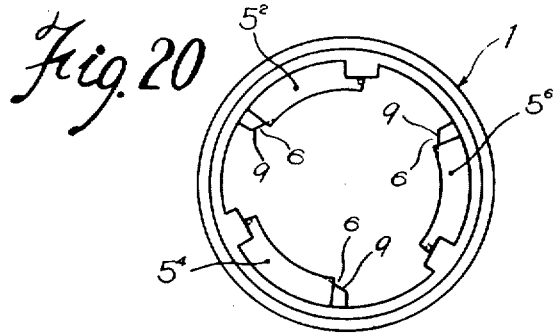
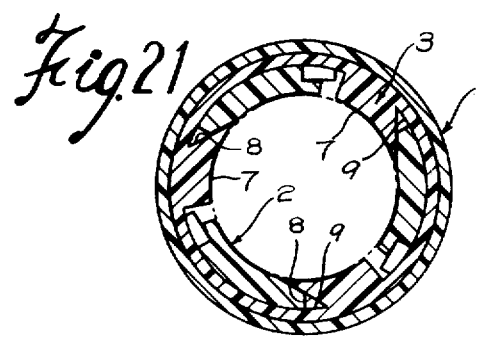
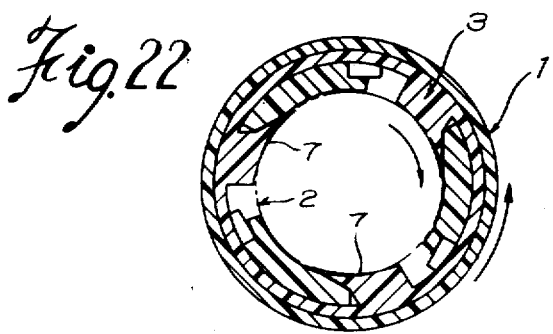

POWER TRANSMISSION SOCKET FOR BOBBINS

The present invention relates to a power transmission socket for bobbins and more particularly to a socket fitted at the lower part of a bobbin, whereupon the yarn is wound to a certain degree, having the advantage that the socket in its contact part with the spindle is directly or indirectly forced to be driven by the spindle and forced to hold it very tight, holding the socket to the spindle, so that no shaking of the socket is transferred to the bobbin, i.e., no vibration to the bobbin is brought about, or the spindle, can be connected precisely with the bobbin.

When, therefore, the yarn was wound on the bobbin, the following defects were caused by the vibration of the bobbin: it could cause the yarn wound on the bobbin to slip, and it was of disadvantage for the spindle and the machine to which it was fitted; it could cause injuries both to the bobbin and to the socket; it also worsened the fitting made up of both the bobbin and the socket; it could also cause the bobbin on which the socket was fitted to fly out of the spindle; and injuries to the spindle bearing fitted with the inner bobbin were also experienced. It was of a disadvantage for the bobbin itself with an abnormal torque resulting therefrom.

When the spindle fitted with the socket was operated at full speed, an inevitable minimum shaking between the two caused vibration to the bobbin in the conventional structure, resulting from the technical disadvantage, such as a permissible error in manufacturing, a different coefficient of expansion, a distortion in manufacturing and the like, even if the socket was made to fit the spindle.

After persistent study thereof for many years with the object to avoid the above-mentioned disadvantages, the present invention has avoided all of the conventional disadvantages as explained above, resulting from vibration to the bobbin, i.e., no vibration to the bobbin occurs in the tightly fitting connection between the socket and the spindle of the present invention, when operated.

It is one object of the present invention to provide a power transmission socket for bobbins, wherein a precise connection of a power transmission from the spindle to the bobbin is arranged when the yarn is wound on.

It is another object of the present invention to provide a power transmission socket for bobbins which minimizes the bobbin shaking caused while a bobbin is rotated at a high speed, by a gap between a spindle and an inner peripheral wall of a socket, by providing a plurality of inward projections each having spindle gripping surface which is relatively movable.

It is yet another object of the present invention to provide a power transmission socket for bobbins comprising a pair of coupled members, namely, an upper member and a lower member, in which the upper portion of the upper member is fixedly secured to the lower part of a bobbin in a conventional manner, and the lower portion of the lower member is detachably fitted over the driving base of a spindle in the conventional manner, wherein the upper portion of the lower member is movably coupled with the lower portion of the upper member in such manner that both members can turn both clockwise and counter-clockwise relative to each other in the range of a predetermined small distance for the purpose of gripping the spindle. Adjacent the inner peripheral wall of the lower portion of the upper member there is provided a series of integrally formed first projections which are spaced equally and adjacent the inner peripheral wall of the upper portion of the lower member there is provided a further series of second projections having a recess into which the first projections can be received respectively. Each of the first projections have two surfaces including an inward surface that serves as a spindle gripping surface and an outward surface that is positioned eccentrically offset relative to the inner peripheral wall of the upper member and which serves as an engaging surface in close contact with a cooperating guide surface of the recess as long as a bobbin is rotating at high speed, urging the first projections displaced inwardly as well as in the direction opposite to that of the rotation of the spindle, and thereby causing the gripping surface thereof to effectively grip the spindle.

It is still another object of the present invention to provide a power transmission socket for bobbins, in accordance with the above-mentioned objective wherein the outward surfaces of the first projections as well as the inward guide surfaces of the recesses are formed as straight surfaces slidable relative to each other.

It is still another object of the present invention to provide a power transmission socket for bobbins, in accordance with the third of the above-mentioned objectives wherein the outward surfaces of the first projections as well as the inward guide surfaces of the recesses are formed as cylindrical surfaces slidable relative to each other.

It is yet another object of the present invention to provide a power transmission socket for bobbins, in accordance with the third of the above-mentioned objectives wherein a series of the second projections having recesses are provided on the inner peripheral wall of the upper member and a further series of second projections having the spindle gripping surface are provided on the inner peripheral wall of the lower member.

With these and other objects in view, which will become apparent in the following detailed description, the present invention will be clearly understood in connection with the accompanying drawings, in which:

FIG. 1 is an axial section, partially in elevation, of an integrally formed conventional prior art power transmission socket for bobbins, with a bobbin secured thereto;

FIG. 2 is an axial section of a first embodiment of a power transmission socket for bobbins designed in accordance with the present invention, with a bobbin secured thereto;

FIG. 3 is a section along the lines III—III of FIG. 2;

FIG. 4 is a bottom plan view of FIG. 2;

FIG. 5 is a top plan view of the upper member of the power transmission socket for bobbins of FIG. 2;

FIG. 6 is a top plan view of the lower member of the power transmission socket for bobbins of FIG. 2;

FIG. 7 is a section along the lines VII—VII of FIG. 2;

FIG. 8 is a cross-sectional view similar to FIG. 7, showing the way of gripping a spindle shown in the dashed line;

FIG. 9 is an axial section of a second embodiment of a power transmission socket for bobbins designed in accordance with the present invention, with a bobbin secured thereto;

FIG. 10 is a section along the lines X—X of FIG. 9;

FIG. 11 is a bottom plan view of FIG. 9;

FIG. 12 is a top plan view of the upper member of the power transmission socket for bobbins of FIG. 9;

FIG. 13 is a top plan view of the lower member of the power transmission socket for bobbins of FIG. 9;

FIG. 14 is a section along the lines XIV—XIV of FIG. 9;

FIG. 15 is a cross-section similar to FIG. 14, showing the manner of gripping a spindle shown in the dashed lines;

FIG. 16 is an axial section of a third embodiment of a power transmission socket for bobbins designed in accordance with the present invention, with a bobbin secured thereto;

FIG. 17 is a section along the lines XVII—XVII of FIG. 16;

FIG. 18 is a bottom plan view of FIG. 16;

FIG. 19 is a top plan view of the upper member of the power transmission socket for bobbins of FIG. 16;

FIG. 20 is a top plan view of the lower member of the power transmission socket for bobbins of FIG. 16;

FIG. 21 is a section along the lines XXI—XXI of FIG. 16; and

FIG. 22 is a cross-section similar to FIG. 21, showing the manner of gripping a spindle shown in the dashed line.

Referring now to the drawings, and more particularly to FIG. 1, an integrally formed conventional prior art power transmission socket for bobbins is illustrated showing a bobbin secured thereto.

Referring now again to the drawings, and more particularly to FIGS. 2–8, one embodiment of a power transmission socket for bobbins is illustrated, comprising a pair of coupled members, namely, an upper member 3 and a lower member 1, in which the upper portion of the upper member 3 is fixedly secured to the lower part of a bobbin 4 in a conventional manner, and the lower portion of the lower member 1 is releasably fitted over a driving base 2' of a spindle 2 in a conventional manner. For example, the member 1 and the spindle 2 is constituted such that the base portion 2' of the spindle 2 is formed with a plurality of engaging members which have recessed portions each provided with flat surface, respectively, each of which engaging members is engaged with a complementary engaging member 1a having a flat inward surface 1b integrally formed along with the inner periphery of the lower member as is shown in FIG. 4. The upper portion of the lower member 1 is operatively axially immovable, e.g., by an annular bead on one of the members and a complementary groove on the other member (FIG. 2), and coupled with the lower portion of the upper member 3 in the manner that both members 1 and 3 can turn both clockwise and counter-clockwise relative to each other in the range of a predetermined small distance for the purpose of gripping a spindle 2. Adjacent the inner peripheral wall of the lower portion of the upper member 3 there is provided a series of integrally formed projections $5^1, 5^3, 5^5, \ldots 5^{2n-1}$ (where $n$ may be any integer) which are spaced equally. Adjacent the inner peripheral wall of the upper portion of the lower member 1 there is provided a further series of projections $5^2, 5^4, 5^6, \ldots 5^{2n}$ having recesses 6 into which the projections $5^1, 5^3, 5^5, \ldots 5^{2n-1}$ can be respectively received such that both members 1 and 3 can turn both clockwise and counter-clockwise relative to each other in the range of a predetermined small distance for the purpose of gripping a spindle 2, i.e., comparing FIGS. 4, 7, and 8.

Each of the projections $5^1, 5^3, 5^5, \ldots 5^{2n-1}$ are formed with two surfaces, i.e., an inward surface 7 that serves as a spindle gripping surface, and an outward surface 8, which is positioned eccentrically offset relative to the inner peripheral wall of the upper member 3 and which serves as an engaging surface 8 which will be in close contact with a cooperating guide surface 9 of the recess 6, as long as a bobbin is rotating at high speed, thereby urging the projections $5^1, 5^3, 5^5, \ldots 5^{2n-1}$ to be inwardly displaced as well as in the direction opposite to that of the rotation of the spindle 2 and thereby causing the gripping surface 7 thereof to grip effectively the spindle 2.

Referring now again to the drawings, and more particularly to FIGS. 16–21, another embodiment of a power transmission socket for bobbins in accordance with the present invention is illustrated, similar to that of the previous embodiment and wherein the outward surfaces 8 of the projections $5^1, 5^3, 5^5, \ldots 5^{2n-1}$, as well as the inward guide surface 9 of the recesses 6 are formed as straight surfaces slidable relative to each other such that both members 1 and 3 can turn both clockwise and counter-clockwise relative to each other in the range of a predetermined small distance for the purpose of gripping the spindle 2, i.e., comparing FIGS. 18 and 20, on the one hand, with FIG. 22.

Referring now again to the drawings, and more particularly to FIGS. 9–15, still another embodiment of a power transmission socket for bobbins is disclosed, similar to the first embodiment, and wherein the outward surface 8 of the projections $5^1, 5^3, 5^5, \ldots 5^{2n-1}$, as well as the inward guide surfaces 9 of the recesses 6 are formed as cylindrical surfaces slidable relative to each other such that both members 1 and 3 can turn both clockwise and counter-clockwise relative to each other in the range of a predetermined small distance for the purpose of gripping the spindle 2, i.e., comparing FIGS. 11 and 14, on the one hand, with FIG. 15 on the other hand.

In accordance with another embodiment of the present invention, a power transmission socket for bobbins can provide a series of projections $5^2, 5^4, 5^6, \ldots 5^{2n}$ having recess 6 on the inner peripheral wall of the upper member 3 and a further series of projections $5^1, 5^3, 5^5, \ldots 5^{2n-1}$ having a spindle gripping surface 7 provided on the inner peripheral wall of the lower member 1.

The present invention has three important features. The contacting portion of the members are cut straight completely from a top 10 to a bottom 11 and from a curved or oblique angle at proper intervals into the required number of cooperative projections $5^1, 5^3, \ldots 5^{2n-1}$ and $5^2, 5^4, \ldots 5^{2n}$, respectively, such that each member is idlingly set with each other when aligned, i.e., so that both members 1 and 3 can turn both clockwise and counter-clockwise relative to each other in the range of a predetermined small distance for the purpose of gripping the spindle 2. The upper member 3 with the projections $5^1, 5^3, \ldots 5^{2n-1}$ is to be connected with the lower member 1, and the latter having the projections $5^2, 5^4, \ldots 5^{2n}$ are to be connected with the upper member 3 (or vice versa), and the members cooperate together.

The operation of the lower member 1, caused from the rotation of the spindle 2, causes the upper and lower members 1 and 3 to engage very strongly along their oblique faces directly or indirectly, so that the upper member is forced to grip very hard the corresponding engaging part of the spindle 2, in order to keep it tense and immovable into perfect operation, i.e., no shaking between the socket and the spindle can occur.

The operation of the lower member 1, caused by rotation of the spindle 2 tightly holds the spindle, directly or indirectly, so that both members 1 and 3 can be forced to engage a corresponding contacting part of the spindle into perfect operation, i.e., no shaking between the spindle 2 and the socket can occur.

Still another important feature is as the above, wherein the recesses 6 are provided at intervals, as many as required, so that the upper member 3 can be idly fitted in the lower member, in order that perfect operation or safely no shaking between the spindle and the socket can occur.

Furthermore, as for main primary materials of the above socket, although not limited thereto, natural plastics, for instance, having proper elasticity at least should be used, so that the upper and lower members 1 and 3 are forced to become butt-jointed into one body.

In the embodiments of the present invention, it is assumed, that the yarn is wound on the bobbin, when the socket has been butt-jointed with the bobbin at one part and with the spindle at another part.

First of all, the socket is fitted on the spindle 2; the lower member 1 is fitted on the power transmission part of the spindle 2; and at the same time by hand the corresponding contact part of the spindle 2 is in advance gripped strongly with the members.

The rotation of the spindle (for instance, 13,000 r.p.m.) causes operation of the lower member 1 of the socket, and accordingly the upper member is operated and the yarn begins to be wound on the bobbin. In this case the upper member 3 derives its operation from the lower member 1 operated by the rotation of the spindle, so that it is forced to turn against the lower member 1 to contact strongly with the projections $5^1$, $5^3$, $5^5$, ... $5^{2n-1}$ fitted with the upper member 3, and to cause the projections $5^1$, $5^3$, $5^5$, ... $5^{2n-1}$ to contact with the rotation part of the spindle 2 and to grip strongly the spindle along the surface 7.

With the hard gripped surfaces being kept tense, during the rotation of the spindle 2, the yarn winding operation is continued. When the yarn has been wound on, a brake stops the rotation of the spindle and leads the socket to its first starting positions.

Moreover, a test on this invention with the new device showed the following improvement on the vibration to the bobbin:

In case the spindle is operated at 13,000 r.p.m. and the rotation of the spindle has 13,000 r.p.m.,
Position of 25 mm from the bobbin lower end:
Conventional: 0.15–0.55 mm;
Present invention: 0.05–0.15 mm. (This means a value up to 0.55 mm indicating the bobbin shaking area, measured at the position 25 mm from the lower end of the bobbin when the spindle is operated at the rotational speed of 13,000 r.p.m. in the case of using the conventional socket for bobbins; and 0.05 to 0.15 mm is the value measured in the same manner as above but in the case of using the novel power transmission socket for bobbins in accordance with the present invention.)
Position of 294 mm from the bobbin lower end:
Conventional: 0.25–0.4 mm;
Present invention: 0.05–0.11 mm.
Position of 350 mm from the bobbin lower end:
Conventional: 0.2–0.6 mm;
Present invention: 0.05–0.15 mm.

Moreover, for the working of this socket, there are two essential points. One essential point is that when the socket has been fitted further with the spindle (i.e., in this case when the contact part of the socket does not forceably grip the spindle), the contacting part of the spindle must be equal in its outer periphery to the inner circle of the corresponding fitting part. The other essential point is that the upper member 3 of the socket must strongly grip the spindle 2 by means of the pushed out projections $5^1$, $5^3$, ... $5^{2n-1}$. Therefore, the socket in its contacting part contacts the spindle and is divided into the required number of projections and the projections are by rotation pushed out to engage the power transmission part of the spindle. The projections of the upper member 3 extend through the recess in the complementary projections of the lower member and the configuration is such that the members are idly fitted rotatably relative to each other, whereby upon rotation of the lower member 1 the projections $5^1$, $5^3$, ... $5^{2n-1}$ of the upper member 3 are pushed out against the spindle 2. The projections $5^1$, $5^3$, ... $5^{2n-1}$ are strongly put together to hold and grip hard the corresponding part of the spindle so that no shaking between the spindle and the socket may occur.

Consequently, the socket can normally and correctly transmit the rotation of the spindle to the bobbin, which is, therefore, so designed, that not only the defects of tee conventional ones above-mentioned may not occur, but also an exceptional socket is provided.

In accordance with the present invention, the bobbin shaking caused, while the bobbin is rotated at a high speed, is minimized by a gap between the spindle and an inner peripheral wall of a socket, by providing a plurality of inward projections $5^1$, $5^3$, $5^5$, ... $5^{2n-1}$, each having a spindle gripping surface 7 which is relatively movable.

While I have disclosed several embodiments of the present invention, it is to be understood that these embodiments are given by example only and not in a limiting sense.

I claim:

1. A power transmission socket for bobbins comprising
   a pair of coupled members, including an upper member and a lower member,
   an upper portion of said upper member adapted to be fixedly secured to the lower part of a bobbin,
   a lower portion of said lower member adapted to releasably fit over a driving base of a spindle,
   the upper portion of said lower member rotatably movably coupled with the lower portion of said upper member such that said upper and lower members can turn both clockwise and counter-clockwise relative to each other in a range of a predetermined small distance, said upper member adjacent its inner peripheral wall of the lower portion of the upper member formed with a series of integrally formed first projections spaced equally from each other, said lower member adjacent its inner peripheral wall of the upper portion of said lower member formed with a series of second projections having recesses, having guide surfaces, into which said first projections, respectively, can be received, and each of said first projections having two surfaces, including an inward surface and constituting a spindle gripping surface, and an outward surface which is oriented eccentrically offset relative to the inner peripheral wall of said upper member and constituting an engaging surface in close contact cooperating with said guide surface of one of said recess when said bobbin is rotating at high speed, thereby urging said first projections to be inwardly displaced as well as in the direction relatively opposite to that of the rotation of the spindle and thereby causing said spindle gripping surface to grip effectively said spindle.

2. The power transmission socket for bobbins, as set forth in claim 1, wherein said outward surfaces of said projections as well as said guide surfaces of said recesses are formed as straight surfaces slidable relative to each other.

3. The power transmission socket for bobbins as set forth in claim 1, wherein said outward surfaces of said first projections, as well as said guide surfaces of said recesses are formed as cylindrical surfaces slidable relative to each other.

* * * * *